United States Patent [19]

Meyer et al.

[11] 4,127,760
[45] Nov. 28, 1978

[54] ELECTRICAL PLASMA JET TORCH AND ELECTRODE THEREFOR

[75] Inventors: Philip J. Meyer; Robert P. Delavega, both of Costa Mesa, Calif.

[73] Assignee: Geotel, Inc., Santa Ana, Calif.

[21] Appl. No.: 667,112

[22] Filed: Mar. 15, 1976

Related U.S. Application Data

[63] Continuation-in-part of Ser. No. 584,983, Jun. 9, 1975, abandoned.

[51] Int. Cl.² .............................................. B23K 9/00
[52] U.S. Cl. .............................. 219/121 P; 219/76.1; 219/76.11; 219/75
[58] Field of Search ............... 219/121 P, 121 R, 76, 219/75, 74; 313/231

[56] References Cited

U.S. PATENT DOCUMENTS

| | | | |
|---|---|---|---|
| 3,304,402 | 2/1967 | Thorpe ................................. | 219/76 |
| 3,313,908 | 4/1967 | Unger et al. ......................... | 219/76 |
| 3,387,110 | 6/1968 | Wendler et al. ..................... | 219/76 |
| 3,567,898 | 3/1971 | Fein ..................................... | 219/121 P |
| 3,684,911 | 8/1972 | Perugini et al. .................... | 219/121 P X |
| 3,740,522 | 6/1973 | Muehlberger ...................... | 219/121 P |
| 3,823,302 | 7/1974 | Muehlberger ...................... | 219/121 P |
| 3,830,428 | 8/1974 | Dyos .................................... | 219/121 P X |
| 3,839,618 | 10/1974 | Muehlberger ...................... | 219/76 X |
| 3,851,140 | 11/1974 | Coucher .............................. | 219/76 |
| 3,914,573 | 10/1975 | Muehlberger ...................... | 219/121 P X |

Primary Examiner—J. V. Truhe
Assistant Examiner—Mark Paschall
Attorney, Agent, or Firm—Gausewitz, Carr & Rothenberg

[57] ABSTRACT

An electrical plasma jet torch has front and back electrodes mounted in a torch body and means for maintaining a high current electric arc between the electrodes. The front electrode is the anode and is formed with a passage that provides a nozzle through which high velocity, high temperature plasma is ejected. The anode includes an improved arrangement of concentric rows of coolant passages extending to the front of the anode. A single annulus formed in the anode provides communication with all passages of the outer row. Passages of both rows are arranged in mutually spaced groups to provide space for a number of powder bores which extend substantially radially through the anode. The powder bores are enlarged to receive a sleeve which is readily replaced when eroded by highly abrasive powders. An annular grooved boss of the front of the anode is received in a groove in a cover plate and sealed thereto by means of O-rings to provide a coolant flow reversing annulus at the front end of the anode. A modified three piece anode has a simple and replaceable arc chamber section.

16 Claims, 13 Drawing Figures

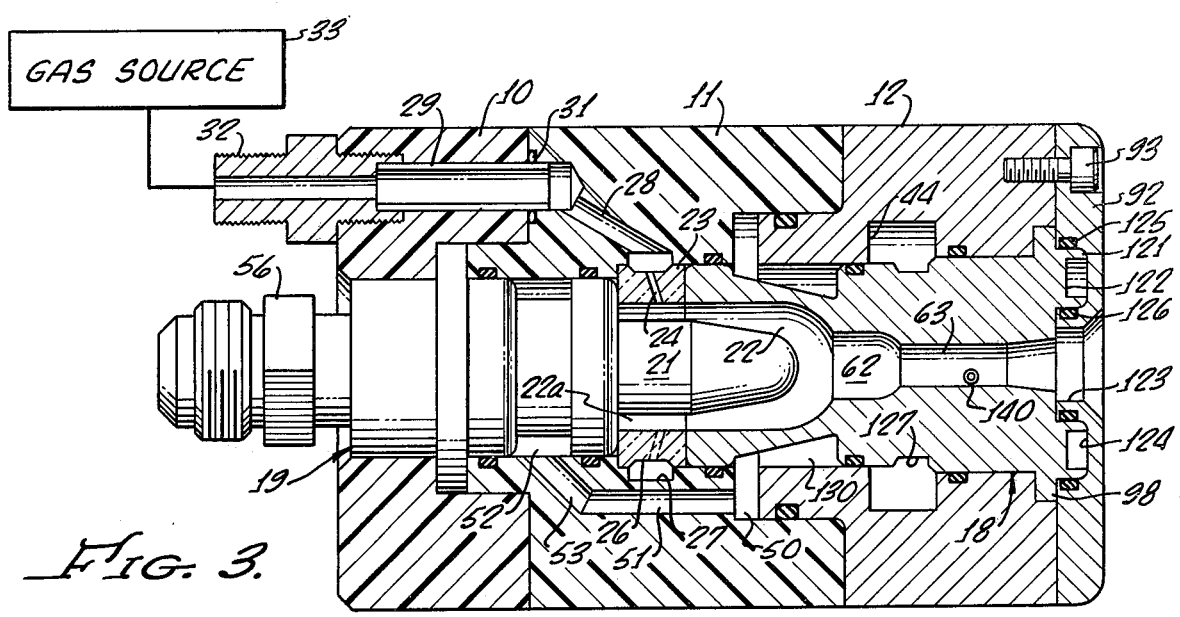
FIG. 3.
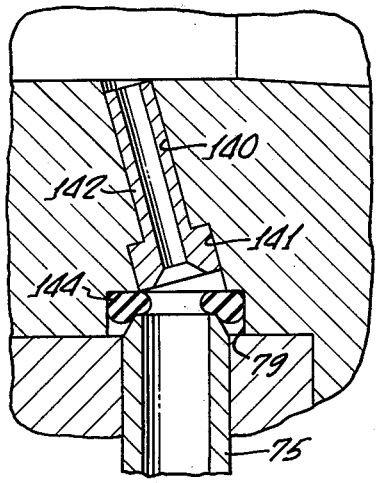
FIG. 6.
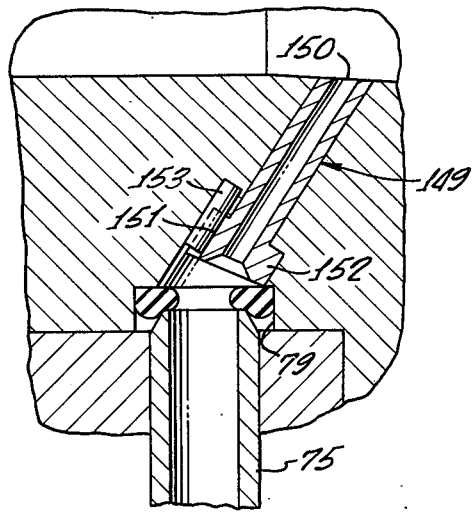
FIG. 7.
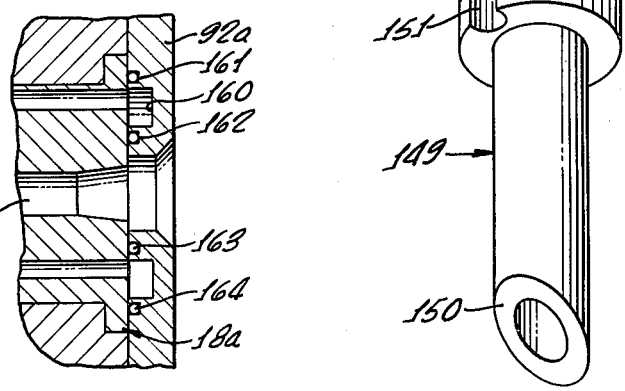
FIG. 9.
FIG. 8.

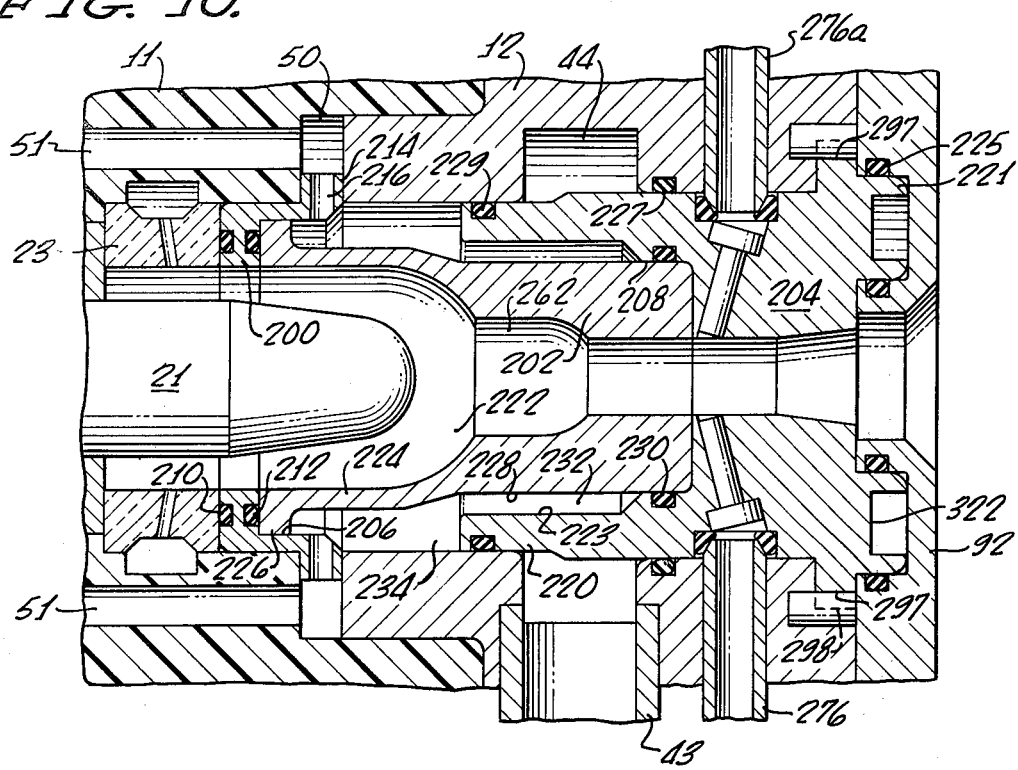
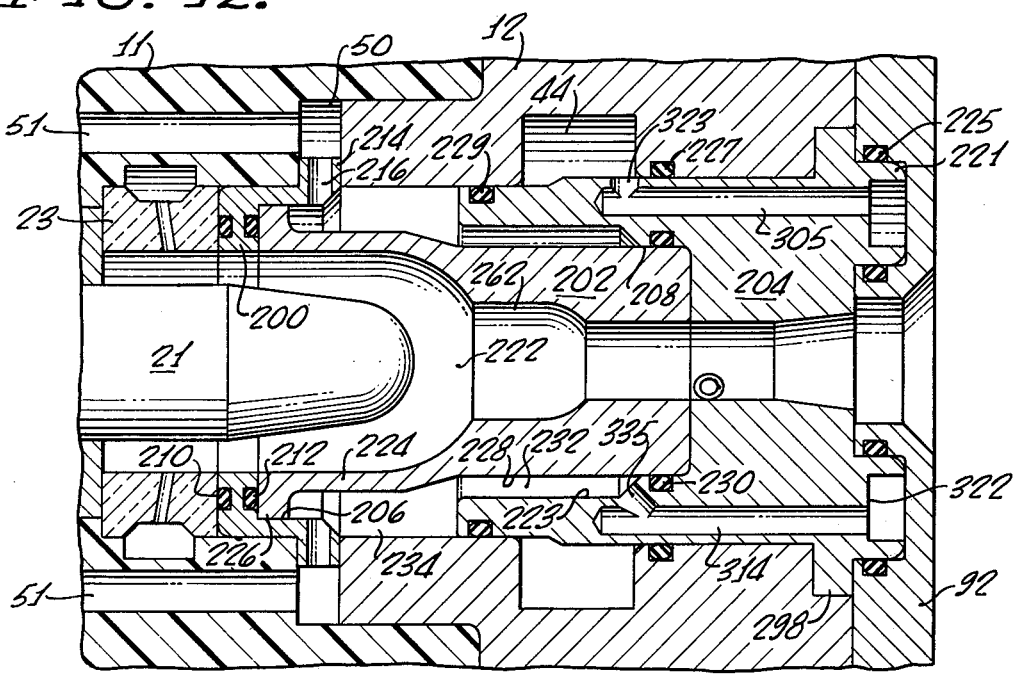

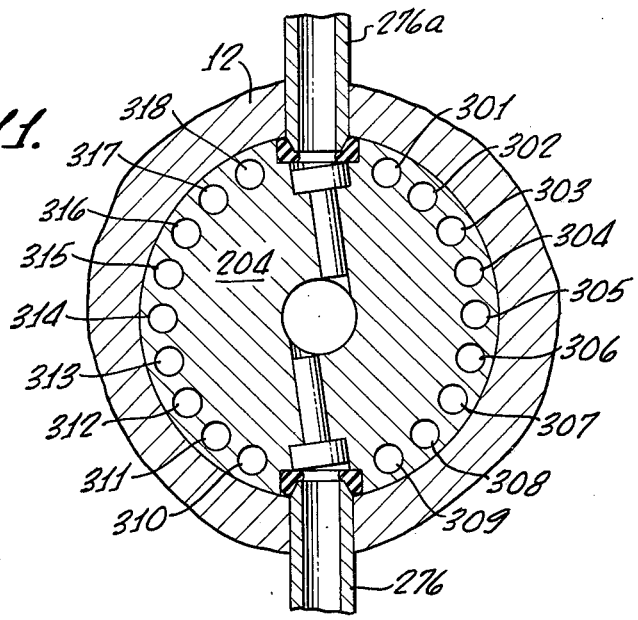
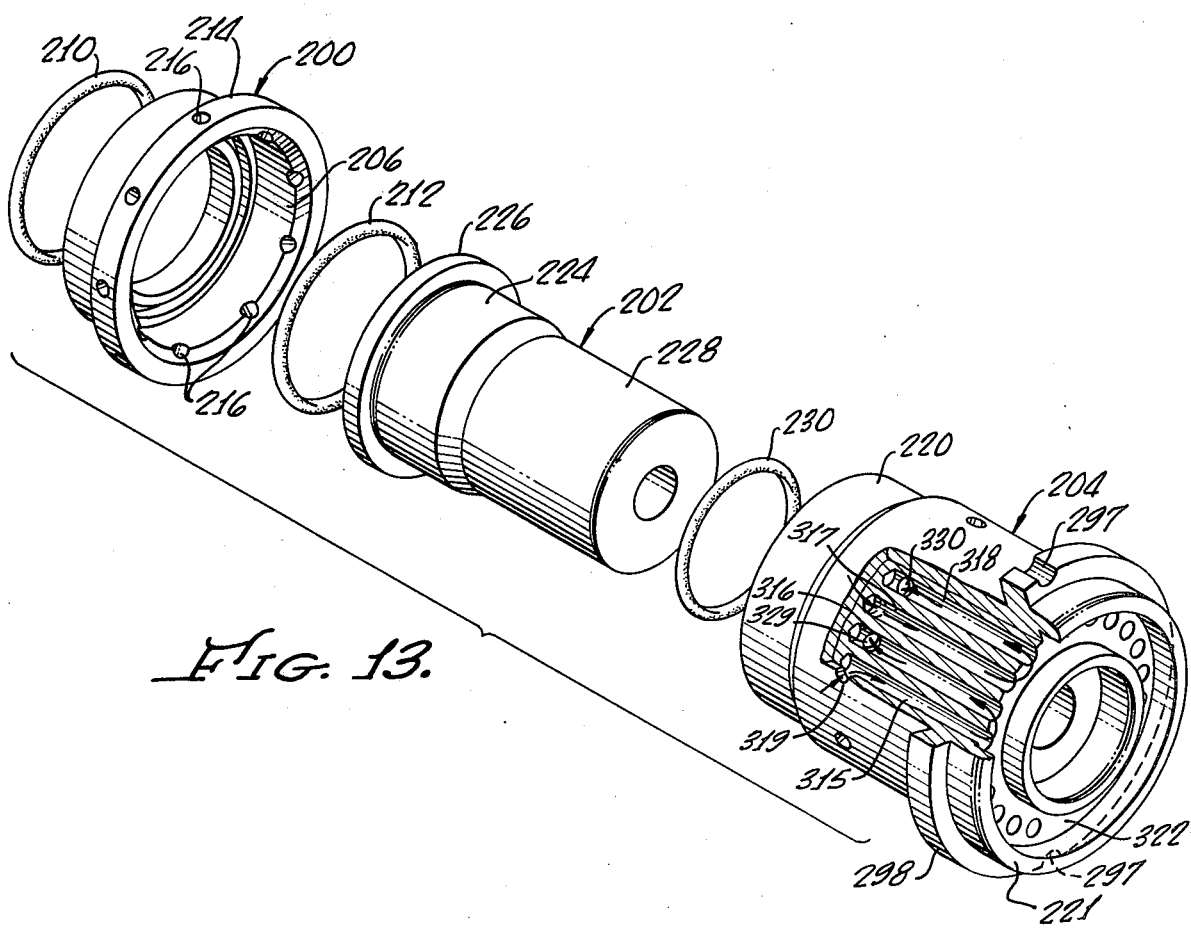

ELECTRICAL PLASMA JET TORCH AND ELECTRODE THEREFOR

CROSS REFERENCE TO RELATED APPLICATION

This application is a continuation-in-part of an application for Electrical Plasma Jet Torch and Electrode Therefor, Ser. No. 584,983 now abandoned, Filed June 9, 1975 by Philip J. Meyer and Robert P. DeLaVega.

BACKGROUND OF THE INVENTION

This invention relates to electrical plasma jet torches and more particularly concerns a torch having an improved nozzle electrode.

A typical electrical plasma jet torch projects a stream of plasma of exceedingly high temperature and velocity that results from an electric arc that is maintained between a back electrode, commonly a cathode, and a front electrode, commonly an anode, which itself is formed with a bore or passage that provides a nozzle for the torch. Where the high velocity plasma stream is to be employed for spray coating, a coating powder is injected into the plasma stream within the nozzle passage and entrained in the projected stream for impingement upon a substrate to be coated. An exemplary high power torch of this type is described in detail in U.S. Pat. No. 3,823,302 to Muehlberger, which is assigned to the assignee of the present application.

Although the anode or nozzle electrode of such a torch is a complex high precision part, and therefor expensive, it has a relatively short life and must be frequently replaced. Life of the nozzle electrode is shorter as velocities and temperatures of the plasma stream increase and as harder and more abrasive powders are employed.

Two factors are most significant in limiting the life of the nozzle electrode, arc erosion and powder erosion. Arc erosion occurs at the point of impingement of the electric arc upon the nozzle electrode. It has been observed that arc erosion will limit the life of an anode in a relatively low velocity gun, Mach I and below, to approximately 10 hours, and to considerably less in high velocity, supersonic torches. Its detrimental effects are closely related to temperature of the electrode. Thus, arc erosion is handled by attempting to cool the nozzle electrode. Often a coolant liquid, such as water, is caused to flow in a jacket around the electrode. Cooling may not be adequate in such an arrangement, in spite of the high heat conductivity of copper electrode material, because of the tremendously high temperatures of the plasma stream within the electrode bore. A typical jacket arrangement for flow of coolant around the anode is shown in U.S. Pat. No. 3,242,305 to Kane et al.

In some cases, the anode itself is formed with a chamber that receives coolant flowing through the chamber to and from the anode. Typical of such an arrangement are the anodes shown in U.S. Pat. No. 3,390,292 to Perugini and in the above-mentioned U.S. Pat. No. 3,823,302. Such arrangements require the drilling of multiple, precisely spaced radial holes in the anode for input or output of water. Even so they do not provide adequate cooling at the front of the anode.

U.S. Pat. No. 3,740,522 to Muehlberger illustrates an arrangement of coolant passages, alternate ones of which flow coolant forwardly and the remaining ones of which flow coolant rearwardly. In the device of this patent a number of radially directed coolant input apertures must be precisely located to communicate with selected axially directed passages, and a groove communicating with the forward ends of all of the bores is closed by means of a soldered closure plug. It is found that the drilling and positioning of radially directed holes is time consuming and expensive. It is difficult to control and inspect the soldering of the closure plug so as to ensure a leak free seal. Improper soldering of the closure plug shows up during use, after the torch has been delivered to the customer, resulting in costly and otherwise undesirable repairs and replacements.

A still further limitation of use of the cooling arrangement of U.S. Pat. No. 3,740,522 derives from the fact that it is frequently desirable to employ a number of powder injection bores extending radially through the anode. With the cooling passage arrangement shown in U.S. Pat. No. 3,740,522 it is possible to employ but a single powder injection bore unless a number of the cooling passages are eliminated, thereby eliminating significant amounts of cooling.

Because the anode wears out and must be replaced with relative frequency, it is significant to keep the cost as low as possible and thus a single basic anode configuration is highly desirable, allowing the one anode "blank" to be completely formed in a common configuration except for powder holes and plasma passage shape. It will be understood that the shape of the plasma passage and the location orientation and number of powder holes may vary from one plasma torch to another depending upon power, velocity and powders to be employed. Thus, a torch having a plasma velocity of Mach I or less may have one nozzle passage and powder bore configuration whereas a torch providing a plasma stream of Mach II or Mach III may have a different nozzle configuration and preferably has other powder bore requirements. Therefore a cooling arrangement such as that of U.S. Pat. No. 3,740,522 prevents the use of a common blank because it permits only one powder bore.

The second major limitation on nozzle electrode life is powder erosion. This occurs with all powders, but is a greater problem with highly abrasive powders such as tungsten carbide for example. It is more pronounced at higher plasma velocities which require higher velocities of powder injection. Powder erosion is particularly manifested by erosion of the powder bore at the point where the powder bore meets the nozzle passage. As this inner end of the powder bore erodes, velocity, spray pattern and even direction of the entering powder change, resulting in undesirable characteristics of the spray coating. Powder erosion has been observed to occur at the inner end of the powder bore and within the nozzle passage itself at areas thereof downstream of the powder bore. To counter effects of powder erosion, a tungsten liner has been formed, inserted into the electrode passage and soldered therein. Holes are drilled substantially radially through the liner in registration with the powder bore that extends through the anode and thus, the relatively soft electrode material (generally copper) is replaced at the point of erosion, namely the inner end of the powder bore and the surface of the nozzle passage. It is replaced by a material that has significantly greater resistance to erosion. However, such a tungsten liner is difficult and expensive to install and itself adds to the very problem that it was designed to counter, namely, the high cost of the nozzle electrodes over the life of the torch. In supersonic spray coating of certain powders, such as tungsten carbide, in the absence of an erosion resistant liner in the nozzle passage, significant powder corrosion has been found to occur within as little as 30 minutes of torch operation. A tungsten liner is a costly way of extending anode life as limited by powder erosion. Another adverse aspect of the use of an erosion resistant liner within the nozzle passage resides in the fact that this liner, like the coolant passage arrangement of U.S. Pat. No. 3,740,522, prevents standardization of the anode design and use of a common anode blank. This is so because the liner must be positioned within the anode at an early stage of the anode manufacture and thereafter change of powder bore position, orientation or number is no longer available. Thus, it will be seen that the powder erosion problem has been handled in the past by controlling the surface of the nozzle passage, but at greatly increased cost of manufacture.

The Patent to Unger et al, U.S. Pat. No. 3,313,908 discloses a front electrode formed as an insert and held in place by a set screw. In addition to the problems of the tungsten liner, dimensional stability, physical positioning and sealing with the arrangement shown in this patent are all significant problems. Further, cooling must be provided entirely by housing passages and no coolant chambers or passages are provided within the insert itself.

Accordingly, it is an object of the present invention to provide a plasma torch and nozzle electrode therefor that eliminate or significantly minimize the above-mentioned problems.

SUMMARY OF THE INVENTION

In carrying out principles of the present invention in accordance with a preferred embodiment thereof, a nozzle electrode is provided with a plurality of radially spaced rows of longitudinal coolant passages extending through the front end thereof, with an annular connection to all passages of an outer row. A cover plate is secured to the front of the electrode and cooperating means on the cover plate and the front end of the nozzle electrode provide a coolant flow reversing chamber. According to a feature of the invention, this chamber is a resiliently sealed annulus defined between the front cover plate and the nozzle electrode. The nozzle passages are positioned in circumferentially spaced groups so as to provide room for positioning a number of powder bores extending through the anode to the nozzle passage. Spaces between groups of passages allow positioning of enlarged powder bores having replaceable sleeves that greatly extend the anode life limitation due to powder corrosion.

BRIEF DESCRIPTION OF THE DRAWINGS

FIG. 3 is a section taken on lines 3—3 of FIG. 2;

FIG. 4 is an enlarged sectional view of the nozzle electrode of the torch showing the coolant passage pattern and powder injection conduits;

FIG. 5 is an enlarged fragmentary sectional view of the nozzle electrode illustrating coolant flow;

FIG. 6 is an enlarged fragmentary sectional detail showing the sealing connection between a powder tube and a powder bore insert;

FIG. 7 is a view similar to FIG. 6 showing a modified form of the insert;

FIG. 8 is a perspective view of the insert of FIG. 7;

FIG. 9 illustrates a modified arrangement for providing a coolant reversing chamber at the front of the anode;

FIG. 10 is a fragmentary sectional view showing a modified form of nozzle electrode;

FIG. 11 is a fragmentary sectional view of the nozzle, at about 90° to the section of FIG. 10;

FIG. 12 is a sectional view of the nozzle electrode of FIGS. 10, 11 taken in a plane normal to the nozzle electrode axis; and FIG. 13 is an exploded perspective view, with parts broken away, of the three piece nozzle electrode of FIGS. 10 through 12.

DETAILED DESCRIPTION

Figure 1:
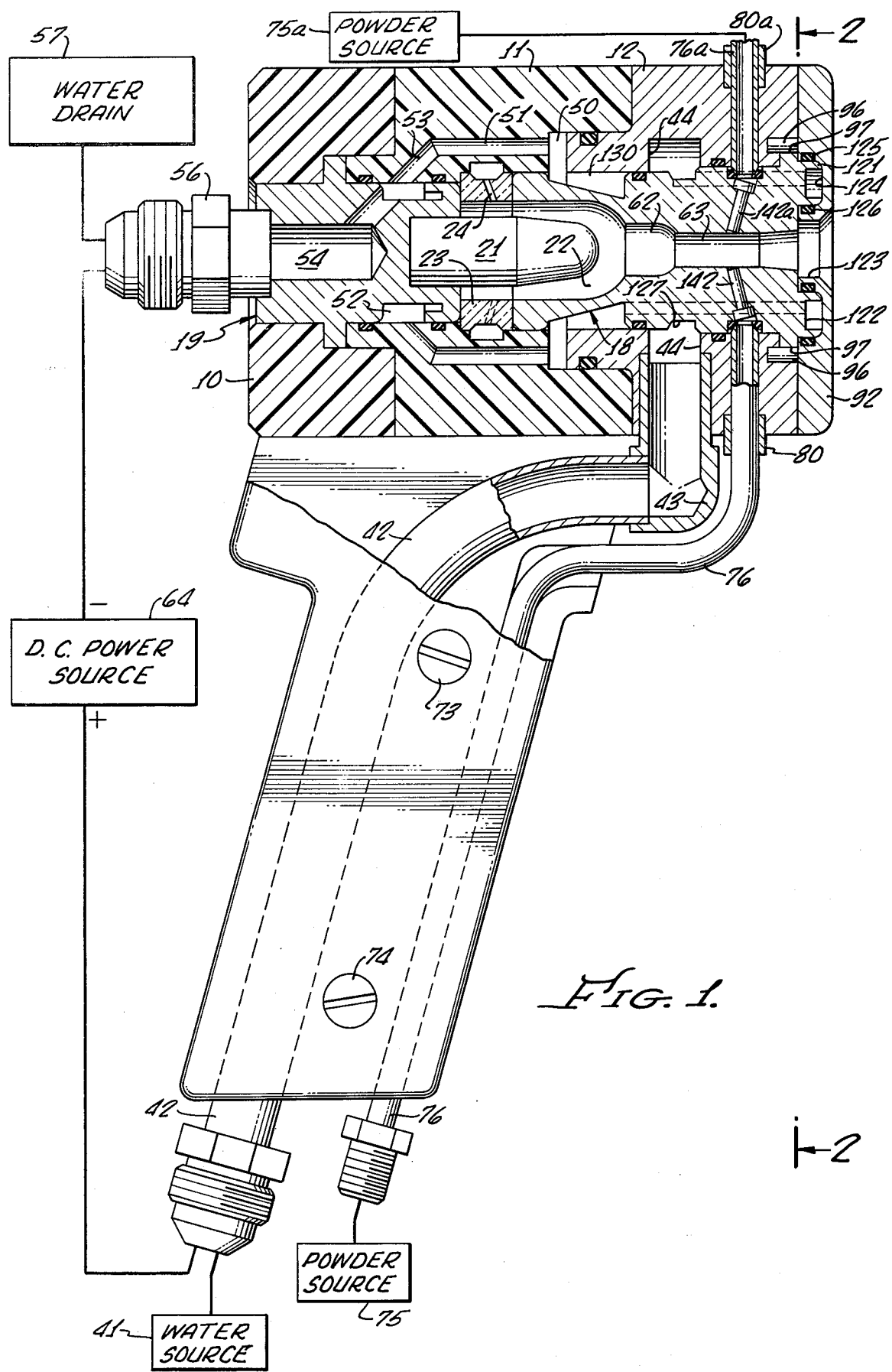
FIG. 1 is a vertical partly sectional view illustrating an electrical plasma jet spray torch and nozzle electrode constructed in accordance with the present invention.
Figure 2:
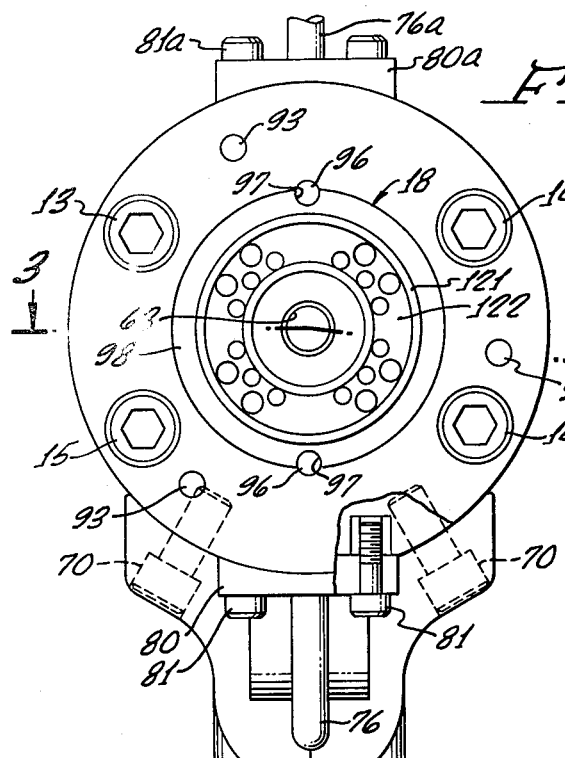
FIG. 2 is a section taken on lines 2—2 of FIG. 1.

The gun disclosed herein and illustrated in FIGS. 1, 2 and 3, is identical to the gun disclosed in the above-identified U.S. Pat. No. 3,823,302 except for the substitution of a nozzle electrode of the present invention for the nozzle electrode of the gun of the patent. It will be understood that the improved electrodes of the present invention are capable of use in a variety of different types of electrical plasma jet torches and spray coating torches, and may have many different external configurations to mate with other structures such as other electrodes and housings of such other guns. Nevertheless, certain of the improved nozzle electrodes have been initially embodied in an anode that can be a direct subtitute for the anode of the gun of U.S. Pat. No. 3,823,302 and accordingly, the electrodes will be described in such a design.

Referring first to FIG. 1, the torch housing is illustrated as comprising three annular body members 10, 11 and 12 which are mounted in closely nested relationship relative to each other. The rear body member 10 is formed of a suitable insulating plastic such as a phenolic.

The intermediate body member 11 is also formed of insulating plastic. Front body member 12 is formed of metal, such as brass.

Each of the annular body members defines an opening therethrough, and the three such openings combine to produce an opening through the torch. Into such torch opening are inserted the anode and cathode means as described below. The annular body members 10, 11 and 12 are maintained in assembled relation despite the very high pressure contained therein by means of four bolts 13, 13a, 14 and 15 of FIGS. 1 and 2, (this modified arrangement and number of bolts facilitates use of opposed pairs of powder conduits) which are oriented longitudinally of the axis of the body members and are circumferentially spaced 90° from each other.

The head of each bolt is recessed into a cylindrical cavity in the forward surface of front body member 12. The threaded rear end of each bolt is threaded into a nut (not shown) which is mounted is a recess in the rear member 10.

All portions of the torch rearwardly of the metallic front member 12 are insulating except for the connection to the cathode means described below. This relationship makes the present apparatus relatively safe to operate.

As shown in FIGS. 1 and 3, the body members 10, 11 and 12 receive in snug fitting relationship a nozzle electrode or anode means 18 and a back electrode or cathode means 19 the latter having a stick (rod) electrode portion 21 which extends coaxially into an arc chamber 22 formed in the rear of nozzle electrode means 18.

A gas injector ring 23 formed of a heat resistant insulating ceramic such as boron nitrite, aluminum oxide, zinconium oxide, etc., is mounted between the adjacent portions of the nozzle electrode and the back electrode, and in radially outwardly spaced concentric relationship to the stick electrode portion 21. More specifically, the cylindrical inner surface of gas injector ring 23 is flush with the cylindrical surface of the side wall of arc chamber 22 so that the gas injector ring and the anode means cooperate to define a gas vortex chamber 22a around the stick electrode portion. Arc gas is introduced into such gas vortex chamber 22a through a multiplicity of small diameter gas inlet passages 24 (FIG. 1 and 3) which are drilled through the gas injector ring 23. Passages 24 in the illustrated embodiment are tangentially oriented relative to the gas vortex chamber 22a and furthermore incline somewhat forwardly relative to a vertical plane which is perpendicular to the axis of the apparatus.

The manner of arc gas injection may be readily changed merely by substituting one ring 23 for another. The ring 23 also produces other important advantages including (a) permitting the vortex chamber 22a to be small in diameter and (b) effectively insulating the nozzle electrode and back electrode from each other.

Gas injector ring 23 is a rectangular cross section except at the exterior surface thereof which is provided with an annular groove 26 communicating with the various gas inlet passages 24. The ring 23 is seated in a recess or counter bore which is formed in the forward side of intermediate body member 11. The wall of such recess or counter bore is undercut, at the region radially outwardly of groove 26, to provide an annular manifold chamber 27 into which arc gas is introduced through a passage 28 (FIG. 3). Passage 28 communicates with a recess in intermediate body 11 and into which a tube 29 is sealingly inserted, there being an O-ring 31. Tube 29 is soldered to a fitting 32 adapted to be connected to a gas source which is schematically represented at 33.

Despite the large amount of power employed and the enormous generating of heat, the heat resistant gas injector ring 33 which is spaced rearwardly from the arcing tip of electrode 21 is able to withstand the resulting high temperatures. Means are provided to cool the seals which prevent escape of gas from manifold chamber 27 except through the gas inlet passages 24.

Water from a suitable source 41, FIG. 1, is caused to flow rapidly through a large diameter conduit 42 and thence into a right angle fitting 43, the upper end of which is brazed into a recess in the front body 12. The fitting communicates with an annular groove 44 formed in the front body 12.

The torch includes a handle screwed directly to the torch body by means of screws 70. The screws project into inserts in the intermediate body 11 and respectively through upper ends of first and second handle portions 71 and 72 which are secured together by bolts 73 and 74.

The handle portions 71 and 72 contain grooves which cooperate to form passages through which the above-described conduit 42 passes as does an additional tube or conduit 76 adapted to supply spray powder to the nozzle electrode as described below. Both the conduits 42 and 76 extend upwardly through the handle then bend forwardly to a position in advance of the handle whereupon they bend upwardly into forward body 12 as shown in FIG. 1. Powder tube 76 is supplied by a powder source 75, FIG. 1, with spray powder entrained in gas. At its upper end portion tube 76 is fixed to a cross member 80 which is detachably connected to body member 12 by screws 81 (FIG. 2). Alternatively, powder tube 76 may be connected directly from the powder source 75 to the forward body member 12, bypassing the handle (which may be eliminated in certain configurations). Where a second powder injection conduit is employed, the torch is provided with a second powder injection tube 76a connected to body member 12 as by being brazed to a cross member 80a which in turn is detachably connected to the body member by screws 81a (FIG. 2). Conduit 76a is conveniently connected to a second powder source 75a.

A front cover plate 92 is detachably connected to the front body member 12 by means of screws 93 (FIGS. 2 and 3).

The present spray torch is of the non-transferred arc type wherein the entire arc is contained within the torch. Thus a DC power source 64 (FIG. 1) has a positive terminal thereof connected to copper conduit 42 to thereby supply DC power of positive polarity to the fitting 43 and thus to the front body 12 and to the anode means 18 in contact therewith. The negative power terminal of power source 64 is connected to water drain fitting 56 and thus to the cathode means or back electrode 19. An electrode arc is maintained between the tip of the cathode means and the wall of the arc chamber 62. High pressure gas in chambers 22 and 62 cooperates with the high electric power contained in the torch and with the characteristics of nozzle passage 63 of the nozzle electrode in such a manner that the gas flows through the nozzle passage is caused to be supersonic, for example, between Mach I and Mach III.

The present torch may also be employed for cutting purposes, for example, by causing the positive terminal DC power source 64 to connect to an electrically conductive workpiece such as a steel plate to be cut, instead of the conduit 42. For cutting purposes, the nozzle passage 63 may be shortened and the electric arc extends clear through the nozzle passage from the back electrode to the workpiece.

Anode means or nozzle electrode 18, in this emodiment, is a single element, an integral copper body which is machined or otherwise formed to contain the various cooling portions described below. The nozzle electrode also contains a primary arc chamber 22 having a rear cylindrical portion which merges with a smaller sized arc chamber 62 which in turn, merges with and coaxially communicates with a nozzle passage 63 having a cylindrical rear portion and a somewhat flared or conical forward portion. The illustrated nozzle passage is of the supersonic type and is preferred for supersonic plasma flow. It may also be subsonic, if desired for certain applications. The nozzle passage and arc chambers formed within the nozzle electrode may be identical to those described in U.S. Pat. No. 3,823,302 or may have other configurations compatible with coolant flow patterns and flow conduits to be described below.

Novel Features of One Form of Improved Nozzle

For improved cooling of the nozzle electrode in an efficient, economical manner, two concentric circumferentially extending and mutually radially spaced rows of cooling passages are formed in the body of the electrode, extending rearwardly through and from the front end thereof. The outermost row (FIG. 4) includes eight passages, 101, 102, 103, 104, 105, 106, 107 and 108, and the inner row includes passages 109, 110, 111, 112, 113, 114, 115, 116, 117, 118 119 and 120. The specific pattern of the passages is of particular importance both functionally and economically as will be described below. Passages of the inner row are of smaller diameter than passages of the outer row and are greater in number than the passages of the outer row. The relative numbers and diameters of passages in the inner and outer rows are chosen so that the total cross-sectional areas of all the passages in one row is equal to the total cross-sectional area of all the passages in the other row. The smaller, more numerous passages of the inner row afford improved cooling. Because of their relatively greater area they provide relatively greater area of contact between coolant and anode and moreover, are positioned more closely to the hot plasma stream in the nozzle passage.

All of the passages extend to and through the front of the anode which is formed with an annular axially projecting boss 121, (FIGS. 1 and 3) having an annular groove 122 formed therein. Passages of both rows terminate at the boss, extending into communication with the groove 122. Front cover plate 92, detachably connected to the body element 12 by bolts 93, has a central aperture 123 through which the exiting plasma stream may pass. The cover plate is formed with an annular rearwardly directed recess 124 constructed and arranged to snugly receive the annular boss 122 of the nozzle electrode. O-rings 125 and 126 are captured in annular grooves formed in the inner and outer circumferential sides of recess 124 to seal the boss groove 122 to the cover plate recess. This provides a continuous sealed flow reversing annular chamber in communication with the front ends of all passages of both rows. Although the sealing O-ring and particularly inner O-ring 126 are positioned relatively close to the high temperature plasma and thus might be expected to be subjected to unacceptably high temperatures, the illustrated arrangement locates these O-rings in close proximity to a relatively large body of rapidly flowing coolant liquid and thus, the rubber O-rings are able to withstand the high temperatures.

The outer row of passages 101 through 108, extends rearwardly of the nozzle electrode to a necked down portion or annulus 127 that is formed on the exterior surface of the anode for communication with annular groove 44 formed in the inner surface of front body 12. Groove 44 communicates with water source 41 and conduit 42 (FIG. 1). Thus, cooling water from the source is caused to flow into and forwardly through all of the outer passages 101 through 108.

Inner passages 109 through 120 extend from the groove 122 of boss 121 rearwardly through the body of the nozzle electrode to a point adjacent the junction of the arc chambers 22 and 62. At this point, the outer surface of the body of the anode is necked down to provide an axially rearwardly facing shoulder 128 from which the anode body tapers outwardly toward the rear of the nozzle body to terminate in a rear cylindrical end portion 129 that is snugly received within the body portion 11. Shoulder 128 extends radially inwardly to the innermost side of the passages of the inner rows, all of which extend through the face of the shoulder to thereby communicate with an annular chamber 130 having a generally trapezoidal section defined between body 12 and the tapered outer surface of nozzle electrode 18 adjacent the arc chamber 22. The configuration is such as to provide an annular chamber 130 in communication with annular chamber 50 between body elements 11 and 12 to provide a coolant chamber of relatively large area in close proximity to a relatively great extent of the arc chamber 22.

Thus, inflowing coolant liquid from source 41 flows through conduit 42 into the chamber defined by annular recesses or grooves 44 and 127, forwardly through the passages of the outer row into the flow reversing chamber defined between the telescoping portions of the nozzle electrode and cover plate, and then rearwardly the passage of the inner row along the entire length of the passage of the nozzle in close proximity to both arc chambers 62 and 22 via annular coolant chambers 130 and 50. From chamber 50, the cooling water flows rearwardly through a large number of circumferentially spaced longitudinal bores or passages 51 (as described in U.S. Pat. No. 3,832,302) in intermediate body 11. Such passages have rear portions which incline inwardly and rearwardly to the chamber 52 which is defined in intermediate body 11 around cathode means 19. The chamber 52 communicates with a plurality of passages 52 which are formed through the cathode means 19 which communicate with a central passage 54 therein and thus with fitting 56 leading to a suitable coolant drain 57.

The above-described arrangement of the nozzle electrode coolant passages provides greatly improved cooling of the nozzle by significantly increasing the length and area of coolant flow. Thus, a large number of longitudinal coolant passages are arranged to extend all the way to the front end of the nozzle and almost entirely to the rear end thereof. The passages and chambers are positioned quite close to the central portions of the nozzle where the heat producing plasma resides, and coolant flow velocity and area are maximized.

Not only does the identified arrangement exhibit improved function and cooling capability but is also affords significant economic advantages in manufacture. Positioning of the coolant inflowing passages in an outer row adjacent the exterior of the anode and positioning rear flowing passages in an inner row, permits a simple annular groove 127 to be formed for connection to all inflowing passages. This is a considerable improvement over the prior arrangements which required a plurality of radially directed input holes to be drilled through the anode for connection with selective ones of a group of passages. Further, the particular arrangement of cooperating elements on the cover plate and the front end of the anode to provide a sealed coolant reversing chamber in communication with passages of both rows is a significant advantage. It enables use of conventional O-rings for sealing by providing adequate cooling of the O-rings and thus eliminates previously required and exceedingly expensive plug soldering as in U.S. Pat. No. 3,740,522, for example.

Still another significant advantage of the described pattern of coolant flow passages and chambers is the fact that the dual rows of passages allow grouping of passages (which are sufficiently large in number and area to provide adequate coolant flow) so as to leave sufficient space for four powder injection bores. Not only is space sufficient for powder injection bores of conventional size but the disclosed pattern allows use of a unique powder bore insert having an enlarged outer flange as will be described more particularly below. Thus, the basic nozzle electrode configuration and coolant flow arrangement thereof may be used in common for a number of different nozzle electrodes having different powder bore configurations. The electrode will permit the use of as many as four powder bores but the same configuration can be used for a nozzle electrode having but one powder bore.

An indexing pin 96 is permanently and fixedly mounted in the forward face of front body 12 and received in any one of a number of circumferentially spaced bores 97 provided in a flange 98 in the anode means. Each bore 97 corresponds in position to a recess for receiving a powder tube to allow the anode to be rotated so that a different powder bore of the nozzle electrode may be employed. The anode may be formed with a number of such bores at different angles, positions and diameters, as described in U.S. Pat. No. 3,832,302, or all of the same diameter, angle and relative axial position so that the bores may be used either one at a time or in diametrically opposed pairs, two at a time. In such an arrangement employing a number of identical powdr bores, a replaceable bore insert (as described below) may not be needed and when powder erosion begins to appear at the end of one bore, the anode is rotated to bring another previously unused powder bore into registration with the powder tube.

The described nozzle electrode and the unique coolant flow passage pattern thereof permits the use of four different circumferentially spaced powder bores. For example, coolant passages of one group 101, 102, 109, 110, 111 are relatively closely spaced to one another but this group as a whole is circumferentially spaced from a second group 107, 108, 118, 119, 120 by a distance sufficient to accept an enlarged powder bore (FIG. 4). A third group of coolant passages 103, 104, 112, 113, 114 and a fourth group 105, 106, 115, 116, 117 are also circumferentially spaced from each other and from the first and second groups to enable positioning of four such powder bores.

POWDER BORE INSERT

Powder erosion has previously been observed both at the innermost end of the powder bore and within the nozzle passage downstream of the powder bore, thus limiting the anode life. However, the present invention provides a means to greatly extend the anode life (as limited by powder erosion) by an improvement of the powder bore alone, without requiring any hardened lining or the like for the nozzle passage. Thus, as illustrated in FIGS. 1, 4 and 6, powder tubes 76 and 76a communicate with a pair of opposed powder bores 140 and 140a drilled in the nozzle electrode and having inner ends which open into the nozzle passage. These bores have enlarged outer ends 141 and 141a that open into still larger cylindrical recesses 79, 79a formed in the anode 18.

Mounted within the powder bores 140, 140a are tubular sleeves or inserts 142, 142a having enlarged flanges on the outer ends as indicated at 143 and 143a. The inserts are provided with apertures extending axially therethrough and terminating, at outer ends of the inserts, in conical entrance sections which communicate with the bores of the powder tubes 176 and 176a. O-rings 144 and 144a are seated in recesses 79, 79a and compressed between the chamfered ends of powder tube 76, 76a and the recesses to thereby provide a resilient sealed and axially adjustable connection between the powder tubes and the inserts. This arrangement avoids the necessity of a metal to metal seal between the powder tube 76 and the anode 18 (or recess thereof) as in the arrangement of U.S. Pat. No. 3,823,302 and thus provides a good sealed connection even though the insert may be manufactured with significantly relaxed tolerances and therefore at less cost. Stated in another fashion, a tight sealed connection between the inserts and powder tubes is ensured in spite of variation in dimensions of the insert due either to manufacturing tolerances or wear of the end of the powder tube in the course of withdrawing the powder tubes for replacement or rotation of the anode. Thus, even though the length of the inserts and cooperating powder tubes may vary, the inherent axial adjustability of the interposed resilient O-ring still affords a tight sealed connection.

An additional unique and unexpected feature of the inserts 140, 140a may be best understood by initially considering a modified form of insert as illustrated in FIGS. 7 and 8. The insert 149 of FIGS. 7 and 8 has the inner end 150 thereof shaped so as to precisely conform to the shape of the inner surface of the nozzle passage. An indexing groove 151 is formed in the outer flange 152 of insert 149 and cooperates with a mating groove (not shown) formed in the enlarged outer end of the powder bore to receive an indexing pin 153. The indexing grooves and pin are arranged so that the insert can be received with the powder bore in only one position of angular displacement about its own axis. In such indexed position, inner end 150 precisely conforms to the surface of the nozzle passage. It will be understood that the axes of the powder bore and insert may be inclined eitherrearwardly or forwardly or laterally with respect to the axis of the nozzle passage and thus for continuity of the shape of the end 150 of insert 149 with the inner surface of the nozzle passages, such axial indexing by means of the indexing grooves and indexing pin 151, 153 is required.

Referring again to the form of insert 142, 142a illustrated in FIG. 4, it is noted that the inner ends 155, 155a of these inserts are simply cut straight across, such ends lying in planes perpendicular to the axes of the respective inserts. The inserts need have close tolerance on only one dimension.

This is the length of the insert from the inner end of flanges 141, 141a (which abut the outwardly facing surface of the enlarged outer end of the powder bores 140, 140a) and the inner end 155, 155a of the insert. This significant dimension is chosen such that the inner end of the insert has one point that is closest to the nozzle passage lying substantially on the surface of the nozzle passage. Stated in another fashion, the length of the insert between its inner end and the inner end of its flange 143 is chosen so that the end of the insert at one point will just reach to the surface nozzle passage and no portion of the insert will protrude into the nozzle passage. Unexpectedly, it is found that this arrangement of the end of the insert which places part of its end somewhat outwardly of the nozzle passage, does not adversely affect the plasma flow at any but very large angles of powder injection. Thus, it is observed that for angles (relative to a radius of the nozzle passage) of powder injection of greater than 50°, an insert of the type illustrated in FIGS. 7 and 8, is required, having an end 150 shaped to conform to the surface of the nozzle passage. For angles of powder injection up to and greater than those illustrated in FIGS. 1 and 4, an insert with an end plane perpendicular to its axis may be used. The inserts of the FIG. 6 embodiment have the outer flanges thereof extending in a plane normal to the insert axes and the outermost surface of the flanges also are normal to the insert axis.

The described inserts may be made of any material that is readily formed and drilled. It is neither necessary nor desirable to make such inserts of a very hard material such as tungsten or tungsten carbide, particularly because of the difficulty in forming and drilling relatively small apertures in such material. Further, the insert of FIG. 4, having both ends lying in a plane normal to its axis, is readily and simply manufactured on a screw machine and needs no additional forming steps.

For use with most powders material such as brass is presently preferred for the insert, but any material erosion of which will not unacceptably contaminate the resulting spray coating, may be employed. For spraying hard powders, such as tungsten carbide, the insert should be made of a harder material. In some coatings certain types of contaminating materials are not acceptable. Further, the inserts will erode during use with abrasive powders and particularly at high velocities where velocity of the incoming powder must necessarily be increased. Thus, one may select an insert material that will minimize contamination problems. In fact, if it should be determined that the material of the nozzle electrode (which erodes significantly at the powder bore in the absence of an insert) would create an unacceptable contamination problem, the latter is quite readily decreased merely by using an appropriate insert material.

The insert is readily and quickly replaceable since it is a relatively loose sliding fit within the powder bore. It is held in this position solely by means of the powder tube and O-rings. Thus, to replace the insert, it is necessary to simply withdraw the powder tube (and O-ring) and then withdraw the insert from the powder bore. This may be done by either inserting a hooked wire into the nozzle passage and pressing the inner end of the insert outwardly or inserting into the insert bore a slender element that may be caused to grip the insert internally and withdraw it.

The brass of the replaceable insert has a resistance to abrasion that is approximately the same as or slightly more than that of copper from which the anode is commonly formed, and thus in a supersonic torch employing highly abrasive powder, significant erosion will occur at the innermost end of the insert at the downstream end of sucn inner end within a relatively short period of time, such as 30 minutes or less of actual use. At such time the powder bore insert may readily be replaced with little effort and in a short time. The replaceable inserts being simply made on a screw machine, are inexpensive. Inserts of a material harder than brass may be employed to extend the insert life.

It will be noted that the use of a replaceable insert not only requires an enlarged powder bore 140 but further, requires an enlargement at the outer end of the powder bore as indicated at 141. For these reasons, the previously described pattern of coolant passages is even more significant since the replaceable insert requires still more space than the relatively small diameter bore, which was previously drilled directly into the nozzle electrode. Thus, grouping the passages of both inner and outer rows in groups such that the space between adjacent groups is considerably greater than the space between adjacent passages of an individual group not only extends anode life by improved cooling but also extends anode life by allowing the use of a replaceable insert in the powder bore.

Illustrated in FIG. 9 is a modified arrangement for defining a coolant flow reversing chamber at the front of the anode. In this arrangement, the electrode boss is eliminated and an annular recess 160 is formed in the front cover plate 92a, in communication with all passages of both inner and outer rows. A pair of concentric circumferential grooves 161, 162 is formed in the axially rearwardly facing surface of the cover plate 92a and receives O-rings 163, 164 which are compresses against the flat front end of the electrode 18a when the cover plate is secured thereto. In both arrangements of the coolant flow reversing chamber, that illustrated in FIGS. 1, 2, 3, 4, and 5, and that illustrated in FIG. 9, the cover plate itself is cooled and, being in contact with the front end of the nozzle electrode, thereby provides additional cooling to the latter.

ANODE WITH REPLACEABLE ARC CHAMBER SECTION

The described powder bore inserts significantly improve anode life with regard to powder erosion. Improved cooling extends the anode life with regard to arc chamber erosion. However, in some situations the relatively cooler plasma gases, argon and helium, are not as readily available as hydrogen and nitrogen and accordingly, the latter may be frequently used as the arc gas. Hydrogen and nitrogen plasma streams have a considerably higher temperatures than streams of helium and argon and thus, the arc erosion problem in the arc chamber is increased with use of these higher temperature gases. In fact, it has been found, with the use of high temperature gases, that it is the arc chamber erosion that is most likely to be the limiting factor on the life of an anode particularly where the anode has the described replaceable powder bore inserts. Further, arc chamber erosion is always undesirable, even with the cooler gases.

To meet the problem of arc chamber erosion, applicants have devised a multi-section nozzle electrode of which an exemplary form is shown in FIGS. 10 through 13. The arc chamber section of this nozzle electrode is a simple, inexpensive, easy to manufacture and readily replaceable component. The complex, intricate and expensive to manufacture nozzle electrode configurations, such as coolant passages and powder bores are all formed in a section of the anode that is not subject to arc erosion. Further, the two main sections are mutually telescoped to afford an optimumly located continuous coolant chamber surrounding the arc chamber anode section.

As shown in FIGS. 10 through 13, the multisection nozzle electrode can be formed as an exact replacement for the electrode shown in FIGS. 1 through 5, and accordingly, is readily interchangeable therewith. Alternatively this electrode can be made with both external and internal (plasma passage) configuration to fit many different torches and for different plasma and powder velocities and materials. In FIGS. 10 through 13, parts corresponding to like parts of the anode of FIGS. 1 through 5 are denoted by like reference numerals, but with the prefix "2" added to distinguish the multi-section anode. The multi-section electrode includes a back section 200, arc chamber or intermediate section 202 and a front section 204. The front and back sections each are formed with enlarged bores 206, 208 facing forwardly and rearwardly, respectively, and forming seats that receive the rear and front ends of the arc chamber section 202.

Back section 200 is formed with annular grooves on both its forwardly and rearwardly facing surfaces for reception of resilient sealing O-rings, 210, 212 which are respectively pressed against the gas injector ring 23 and the rear most face of arc chamber electrode section 202, at the front of the back section. The back section also includes a radially outwardly extending peripheral flange 214 in which are formed a number of circumferentially spaced and substantially radially extending coolant water apertures 216. Flange 214 is securely captured between the intermediate housing section 11 and the front housing section 12 to firmly and positively lock this electrode section in position with its coolant flow apertures 216 to fluid communication with the chamber 56 and passages 51 which lead via fitting 56 to the coolant drain 57 (FIG. 1).

The nozzle electrode front section 204 is the most expensive and complex section of the electrode but is subject to the least wear, particularly when used with the described powder bore inserts. Accordingly, it has a relatively long life. This front section has formed therein the powder injection conduits which receive replaceable inserts 276, 276a identical with the corresponding parts of the anode of FIGS. 1 through 5. Section 204 also has a flange 298 and a forwardly facing annular groove 222 formed in an annular axially projecting boss 221 and including indexing grooves 297 (FIG. 13) all constructed and arranged just as are corresponding elements of the previously described anode.

The front section of this multi-section anode has a different and considerably improved arrangement of cooling passages. Longitudinally extending coolant passages 301 through 318 are drilled into the anode front section 204 from the annular groove 222 at the front thereof and positioned in a single circumferentially extending row. These passages are positioned in two groups that are mutually spaced circumferentially, passages 301 through 309 of a first group on one side being spaced circumferentially from passages 310 through 318 of a second group on the diametrically opposite side so as to provide for location of the powder injection bores and replaceable inserts 276, 276a between adjacent ends of the two groups.

Where nine passages are employed in each group of the longitudinally extending passages four radially directed apertures, of which aperture 319 shown in FIG. 13, extend through one side of the exterior of the front section into respective ones of four passages of a first set of passages of the first group and five radially extending apertures, of which aperture 323 is shown in FIG. 12, extend through the diametrically opposite side of the exterior of the front anode section into respective ones of the passages of a first set of five passages of the second group.

Five apertures, of which apertures 329, 330 are shown in FIG. 13, extend substantially radially (but actually at a slight angle to facilitate insertion of a drill through the enlarged bore of the front section) from the interior of the front section into respective ones of a second set of five passages of the first group. Four apertures, of which aperture 335 is shown in FIG. 12, extend substantially radially (at a slight angle) from the interior of the front section into respective ones of a set of four of the passages of the second group. First and second sets of each group are interdigitated.

Thus, coolant water may flow, as indicated by the arrows in FIG. 13, through the nine exterior apertures of the front section into alternate ones of the passages 301 through 318, thence forwardly to the annular chamber 122, rearwardly through the remaining nine of the passages 301 through 318 and through the interior apertures to an annular cooling chamber 232 circumscribing the arc chamber section and more particularly described below. Although nine passages are shown, it will be readily appreciated that other numbers of these passages may be employed.

The first enlarged bore 208 of front section 204 which forms a seat for the front end of the arc chamber section 202, is further enlarged and extends into a rear sleeve portion 220 having an enlarged bore 223 that extends rearwardly past the forward end of the arc chamber section 202. Rear sleeve portion 220 of the front section thus has an inner surface defining the bore 223 that circumscribes and is radially spaced from the front portion of arc chamber section 202, extending rearwardly to the rear most portion of the smaller arc chamber 262. Thus, the arc chamber section of the anode is telescoped into the front section.

Arc chamber section 202 is of a simply generally cylindrical configuration and entirely free of coolant passages. It has its interior formed in the desired configuration of the corresponding portion of the nozzle passage which is formed collectively by coaxial nozzle passage sections in the arc chamber section and front section of the nozzle electrode. The exterior of the arc chamber section has an intermediate cylindrical portion 224 and a peripheral flanged rear portion 226 which abuts the seat at the rearward end of the forward facing bore 206 of the rear nozzle electrode section. Intermediate portion 224 tapers forwardly at the rear end of sleeve portion 220 of the front section and merges into a necked down portion 228 which extends into and is radially spaced from the rear enlarged bore 223. This necked down portion terminates at and seats upon a shoulder on the rear facing end of the bore 208 of this front nozzle electrode section. A resilient sealing O-ring 230 is mounted in a groove in bore 208 to seal the annular space between mutually telescoped portions of the front and arc chamber nozzle electrode sections.

The narrow and relatively deep (extending relatively far forwardly) annular coolant chamber 232 is defined, in part, between the exterior of necked down section 228 of the arc chamber section and the inner surface of enlarged bore 223 of the front section. This narrows forwardly extending annular chamber communicates at its forward end with the interior apertures of the front section and, at its rear end, with an annular chamber 234 defined between intermediate portion 224 of the arc chamber section and the front housing section 12. Additional O-rings 225, 227 and 229 are provided for sealing the several parts.

Coolant chamber 234 communicates with apertures 216 in the back section of the nozzle electrode so that rapidly flowing coolant water may pass forwardly through alternate ones of the coolant passages 301 through 318 and rearwardly through the remaining ones of these passages, to cool the front portion of the nozzle electrode and thence may flow through the chambers 232 and 234, apertures 216, chamber 50, passage 52, bore 54 and fitting 56 to water drain 57.

It will be noted that the rapidly flowing coolant fluid passes directly through the nozzle electrode and in particular, passes close to the interior surface thereof at the outer portion of the arc which is struck in the arc chamber 262. Further, the coolant chamber adjacent nearly the entire arc chamber section is a continuous annular chamber and is not formed simply by a row of longitudinal passages. Thus, a more efficient cooling is achieved by virtue of increased area of heat transfer between the coolant liquid and this section of the anode. This improved cooling is a surprising and unexpected result of the present design. This multi-section anode is designed primarily to extend anode life of a plasma torch by making the arc chamber section replaceable. Surprisingly, it has been found that the configurations of the front and back sections enable provision of the continuous annular coolant chamber 232 which extends relatively far forwardly and enables the manufacture of such a configuration in a convenient and economical manner. The formation of such a narrow and deep annular passage in an anode of integral construction could be a difficult and exceedingly expensive manufacturing task. However, because the two anode sections, the front and arc chamber sections, are telescoped one within the other, the replaceable section is simply made with a necked down cylindrical front portion and the front section is simply formed with an enlarged bore. Further, this arrangement enables the length of the longitudinal passages 301 through 318 to be decreased, thus further decreasing manufacturing cost of the front section.

The front and back sections of the nozzle electrode of FIGS. 10, 11 and 12 are spaced from one another and the two are fixedly secured to the nozzle, the back section being clamped between housing sections 11 and 12 and the front section being clamped between front plate 92 and front housing section 12. The front and back sections, respectively, abut the front and back of the arc chamber section and firmly secure this section in position without any connection between the front and back sections. With this arrangement, axial dimensional changes of the housing are readily accommodated by the multi-section nozzle electrode and will not disturb the essential abutment and electrical contact between the arc chamber section and the front section.

It will be recalled that one side of the DC power source is connected to the nozzle electrode via the water conduit and in and about water chamber 44. Thus, the electric current must be conducted between the front section and the arc chamber section and contact between the two must remain firm or voltage will drop and operation will be degraded. The provision of the O-rings on both the forward and rearward facing surfaces of the back section 200 of the nozzle electrode cooperates with the described multi-section anode structure to maintain firm physical and electrical contact between sections 202 and 204 in the presence of the axial dimensional changes of the housing which may occur with the great temperature changes that exist as the torches turn on and off.

The described configuration of the deep narrow annular chamber 232 also solves a significant problem in sealing of the parts relative to one another. This passage, because of its relatively far forward extent, is located close to the O-ring 230 and thus, the latter is cooled and will exhibit a reasonably long life. This O-ring is positioned so close to the hot plasma within the nozzle passages that it would be quickly destroyed without the presence of a closely adjacent coolant liquid.

The described nozzle electrode is readily inserted in and removed from the torch. Front cover plate 92 is removed, housing section 12 is also removed and the back section 200 of the nozzle electrode is positioned against the gas injector ring 23. Housing section 12 is then replaced to clamp the back section in place. Arc chamber section 200 and front section 204 are then positioned as illustrated in the drawings and front cover plate 92 is again attached.

To replace the arc chamber section 202, it is necessary only to detach the front cover plate 92, withdraw the front and arc chamber anode sections and reinstall these components with a new and inexpensive arc chamber section.

It will be seen that the problem of expense of replacement of an entire anode because of arc chamber erosion has been significantly decreased by use of a replaceable arc chamber section that has a simple configuration and is of minimum cost. The configuration of the described arc chamber section is such that it may be manufactured solely on the lathe without removing it for drilling of holes or other machining operations. Thus, even if the arc chamber life remained the same for this electrode as it is for other electrodes, this multi-section nozzle electrode is a considerable improvement. Nevertheless, it is found, surprisingly and unexpectedly, that the improved cooling configuration, enabled by the use of a multi-section electrode, actually extends the life of the arc chamber section 202 (as limited by arc chamber erosion), particularly with the hotter arc gases, hydrogen and nitrogen. Thus, not only is the eroding arc chamber section simple, cheap and replaceable, but its life is unexpectedly longer than corresponding one piece anodes.

It will be seen that there have been provided several different nozzle configurations, which individually extend the life of different sections of a nozzle electrode, and both individually and collectively, extend the life of the entire anode. The anode is formed of a relatively complex section and a relatively simple and inexpensive section. The latter is located at a point of maximum erosion and readily replaceable. Similarly, a point of maximum erosion of the complex section is identified and a replaceable insert is employed to minimize erosion problems in the complex section and minimize the need to replace it.

The foregoing detailed description is to be clearly understood as given by way of illustration and example only, the spirit and scope of this invention being limited solely by the appended claims.

What is claimed is:

1. An electrical plasma jet torch comprising
a torch body,
a back electrode mounted within said body,
a nozzle electrode mounted with said body,
means for maintaining a high-current electric arc between said electrodes,
said nozzle electrode including
a nozzle passage extending through said nozzle electrode from the back to the front end of said nozzle electrode,
a plurality of radially spaced rows of longitudinal coolant passages formed in said nozzle electrode and extending through said front end thereof,
a cover plate secured to the front of said torch body at the front end of said nozzle electrode,
cooperating means on said cover plate and said front end of said nozzle electrode for providing a coolant flow reversing chamber interconnecting the front ends of said coolant passages, passages of said rows being positioned in groups of pasages, said groups being mutually spaced circumferentially by distances greater than the circumferential spacing between adjacent passages of a row within a group, and including powder conduit means extending substantially radially through said nozzle electrode to said nozzle passage between groups of at least one pair of said groups for receiving powder and directing it into said nozzle passage.

2. The torch of claim 1 wherein said coolant passages are positioned in at least three mutually spaced groups and wherein said powder conduit means includes at least two substantially radial powder bores, each powder bore extending between a respectively different pair of adjacent groups of passages.

3. The torch of claim 1 wherein said powder conduit means comprises a substantially radial enlarged bore and a replaceable insert in said bore.

4. The torch of claim 3 wherein said bore includes an enlarged outer end, a powder conveying tube extending through said torch body to said insert, and adjustable connecting and sealing means interposed between said insert and powder conveying tube in said enlarged outer end.

5. The torch of claim 4 wherein said enlarged bore and said insert extend at an angle to a radius of said nozzle passage and wherein said insert is formed with a peripheral flange on the outer end thereof, said insert having an inner end lying in a plane normal to the axis of the insert with one point on said inner insert end that is closest to said nozzle passage being positioned substantially at the inner surface of said nozzle passage.

6. The torch of claim 4 wherein said insert has a peripheral flange on an outer end thereof and wherein said bore includes a sealed enlargement receiving and seating said peripheral flange.

7. An improved nozzle electrode for use with an electrical plasma jet torch having a torch housing, a front cover plate secured to said housing, and a back electrode mounted in the housing for cooperation with the nozzle electrode to sustain an electric arc therebetween, said nozzle electrode comprising
a body having a nozzle passage extending therethrough to a front end of said body,
a plurality of circumferentially extending rows of coolant conduits in said body circumscribing said nozzle passage,
said rows being mutually spaced radially of one another,
said conduits extending longitudinally of said body from said front end,
said body having a circumferentially extending reduced portion spaced rearwardly of said front end and communicating with rearward portions of passages of an outermost one of said rows,
passages of an inner one of said rows being of smaller diameter and greater number than passages of another of said rows.

8. An improved nozzle electrode for use with an electrical plasma jet torch having a torch housing, a front cover plate secured to said housing, and a back electrode mounted in the housing for cooperation with the nozzle electrode to sustain an electric arc therebetween, said nozzle electrode comprising
a body having a nozzle passage extending therethrough to a front end of said body,
a plurality of circumferentially extending rows of coolant conduits in said body circumscribing said nozzle passage,
said rows being mutually spaced radially of one another,
said conduits extending longitudinally of said body from said front end,
said body having a circumferentially extending reduced portion spaced rearwardly of said front end and communicating with rearward portions of passages of an outermost one of said rows,
said passages of said rows being positioned in groups of passages, the groups being mutually spaced circumferentially by distances greater than the circumferential spacing between adjacent passages of a row within a group, and including powder conduit means extending substantially radially through said nozzle electrode to said nozzle passage between at least one pair of said groups for receiving and directing powder into said nozzle passage.

9. The nozzle electrode of claim 8 wherein said passages are positioned in at least three mutually spaced groups and wherein said powder conduit means includes at least two substantially radial powder bores, each powder bore extending between groups of a respectively different pair of adjacent groups of passages.

10. The nozzle electrode of claim 8 wherein said powder conduit means comprises a substantially radial enlarged bore, and a replaceable sleeve in said bore.

11. The nozzle electrode of claim 10 wherein said enlarged bore and said sleeve extend at an angle to a radius of said nozzle passage said sleeve having an inner end lying in a plane normal to the axis of the sleeve with one point on said inner sleeve end that is closest to said nozzle passage being positioned substantially at the inner surface of said nozzle passage.

12. An electrical plasma jet torch comprising
a torch housing,
a back electrode mounted within said housing,
a nozzle electrode mounted within said housing and having a nozzle passage extending therethrough,
means for maintaining a high-current electric arc between said electrodes, said nozzle electrode comprising,
a replaceable arc chamber section adjacent said back electrode, and a front section separably connected and in electrical contact with said chamber section,
said forward section including an enlarged rearwardly facing bore, said arc chamber section being received within said bore and radially spaced therefrom to define an annular coolant chamber,
a plurality of coolant passages extending through said forward section and communicating with said coolant chamber, including a cover plate secured to the front of said housing,
cooperating means on said cover plate and said forward nozzle electrode section for providing a coolant flow reversing chamber communicating with said coolant passages, said passages comprising a circumferentially extending row of longitudinally extending passages,
a first group of coolant holes extending through the exterior of said forward section into respective ones of a first group of said passages,
a second group of coolant holes extending through said forward section from said bore into respective ones of a second group of said passages,
said passages being positioned in circumferential groups that are mutually spaced circumferentially by distances greater than the circumferential spacing between passages of a circumferential group, powder conduit means extending substantially radially through said forward section between at least one pair of said circumferential groups of passages, and replaceable insert means in said powder conduit means.

13. An electrical plasma torch comprising
a torch body,
a back electrode mounted within the body,
a nozzle electrode mounted within the body and having a nozzle passage extending therethrough, said nozzle electrode defining an arc chamber,
means for maintaining a high current electric arc between said back electrode and a surface area of said arc chamber, whereby erosion due to said arc subjects said surface area to more wear than other portions of said nozzle electrode,
said nozzle electrode having a plurality of coolant passages extending longitudinally therethrough,
said nozzle electrode including a front section and a replaceable arc chamber section,
means for defining a coolant chamber around said arc chamber section, said passages being located in said front section and extending therefrom into communication with said coolant chamber, said surface area of said arc chamber which is subject to erosion of said arc being located entirely within said replaceable arc chamber section, whereby the front section is a relatively complex part but subject to relatively little arc erosion, and the arc chamber section is a relatively simple part, readily replaceable, and subject to considerably more arc erosion,
said coolant passages including at least two groups that are mutually spaced circumferentially by a distance greater than the circumferential spacing of passages of a group, and including powder conduit means extending substantially radially through said nozzle electrode to said nozzle passage between groups of at least one pair of said groups for receiving powder and directing it into said nozzle passage.

14. In an electrical plasma torch having a back electrode, a nozzle electrode having a nozzle passage, and means for maintaining an electric arc from said back electrode that impinges upon a portion of said nozzle electrode which portion is therefore subject to considerable arc erosion, said nozzle electrode having a plurality of coolant passages extending therethrough along said nozzle passage, an improved nozzle electrode comprising
a front nozzle section having said coolant passages extending therethrough, said front section being a relatively complex part and subject to relatively little arc erosion,
an arc chamber section abutting said front section and containing all of said nozzle portion which is subject to said arc erosion, said arc chamber being a relatively simple part, subject to maximum arc erosion, and being readily replaceable,
said front section including a plurality of coolant flow apertures drilled therein at an angle to said coolant passages and in communication therewith, said arc chamber section being free of such angled apertures whereby it may be readily manufactured and replaced.

15. An electrical plasma jet torch comprising
a torch body,
a back electrode mounted within said body,
a nozzle electrode mounted with said body,
means for maintaining a high-current electric arc between said electrodes, said nozzle electrode including
a nozzle passage extending through said nozzle electrode from the back to the front end of said nozzle electrode,
at least one row of longitudinal coolant passages formed in said nozzle electrode and extending through said front end thereof,
a cover plate secured to the front of said torch body at the front end of said nozzle electrode,
cooperating means on said cover plate and said front end of said nozzle electrode for providing a coolant flow reversing chamber interconnecting the front ends of said coolant passages,
passages of said row being positioned in groups of passages, said groups being mutually spaced circumferentially by distances greater than the circumferential spacing between adjacent passages of a row within a group, and
including powder conduit means extending substantially radially through said nozzle electrode to said nozzle passage between groups of at least one pair of said groups for receiving powder and directing it into said nozzle passage.

16. An improved nozzle electrode for use with an electrical plasma jet torch having a torch housing, a front cover plate secured to said housing, and a back electrode mounted in the housing for cooperation with the nozzle electrode to sustain an electric arc therebetween, said nozzle electrode comprising
a body having a nozzle passage extending therethrough to a front end of said body,
at least one circumferentially extending row of coolant conduits in said body circumscribing said nozzle passage,
said conduits extending longitudinally of said body from said front end,
said body having a circumferentially extending reduced portion spaced rearwardly of said front end and communicating with rearward portions of at least some of said passages, said passages being positioned in groups of passages, the groups being mutually spaced circumferentially by distances greater than the circumferential spacing between adjacent passages within a group, and
including powder conduit means extending substantially radially through said nozzle electrode to said nozzle passage between at least one pair of said groups for receiving and directing powder into said nozzle passage.

* * * * *